United States Patent
Lambrecht (10) Patent No.: US 9,571,397 B2
(45) Date of Patent: Feb. 14, 2017

(54) FLOW CONTROL MECHANISMS ON SYNCHRONOUS SERIAL TDMA BUS

(75) Inventor: Xavier Lambrecht, Romsee (BE)

(73) Assignee: OPTIS CIRCUIT TECHNOLOGY, LLC, Plano, TX (US)

(*) Notice: Subject to any disclaimer, the term of this patent is extended or adjusted under 35 U.S.C. 154(b) by 1099 days.

(21) Appl. No.: 12/158,997

(22) PCT Filed: Dec. 22, 2006

(86) PCT No.: PCT/IB2006/055029
§ 371 (c)(1),
(2), (4) Date: Oct. 31, 2008

(87) PCT Pub. No.: WO2007/072463
PCT Pub. Date: Jun. 28, 2007

(65) Prior Publication Data
US 2009/0268708 A1    Oct. 29, 2009

(30) Foreign Application Priority Data

Dec. 23, 2005  (EP) ..................... 05112936

(51) Int. Cl.
*H04L 12/801* (2013.01)
*H04L 12/43* (2006.01)
*H04L 12/851* (2013.01)

(52) U.S. Cl.
CPC .............. *H04L 47/10* (2013.01); *H04L 12/43* (2013.01); *H04L 47/18* (2013.01); *H04L 47/2425* (2013.01)

(58) Field of Classification Search
None
See application file for complete search history.

(56) References Cited

U.S. PATENT DOCUMENTS

| | | | |
|---|---|---|---|
| 5,008,901 A | 4/1991 | Wallach et al. | |
| 5,222,062 A | 6/1993 | Sharma et al. | |
| 5,654,960 A | 8/1997 | Kohlschmidt | |
| 6,744,778 B1* | 6/2004 | Allpress et al. | 370/442 |
| 2001/0038674 A1* | 11/2001 | Trans | 375/355 |
| 2003/0137970 A1* | 7/2003 | Odman | 370/350 |

(Continued)

FOREIGN PATENT DOCUMENTS

| | | |
|---|---|---|
| KR | 10-0383685 | 4/2003 |
| WO | WO 96/01534 A2 | 1/1996 |
| WO | 03063434 A2 | 7/2003 |

OTHER PUBLICATIONS

International Business Machines Corporation "Interconnect Bus Protocol Using Dynamic Flow Control" Research Disclosure, Mason Publications, vol. 452, No. 133, Dec. 2001.

*Primary Examiner* — Christopher Crutchfield
*Assistant Examiner* — Thinh Tran
(74) *Attorney, Agent, or Firm* — The Danamraj Law Group, P.C.; Thomas L. Crisman; Kenneth A. McClure (57) ABSTRACT

A method of transmitting data allows flow control information to be transmitted with the user data over a synchronous bus. A channel is defined, identifying the source and at least one sink, and this includes the definition of a transport profile, indicating a flow control requirement for the data. Data is then transmitted from the source over the bus in at least one data time slot (30) and, if indicated by the transport profile, flow control information is also transmitted from the source over the bus in at least one flow control time slot (20) associated with the data time slot.

24 Claims, 10 Drawing Sheets (56) References Cited

U.S. PATENT DOCUMENTS

2003/0152059 A1\* 8/2003 Odman ................. 370/338
2005/0201412 A1   9/2005 Janneteau et al.
2006/0018269 A1\* 1/2006 Agrawal et al. ........ 370/321
2006/0245533 A1\* 11/2006 Rostampour ........... 375/377
2007/0133611 A1\* 6/2007 Li et al. ................. 370/503

\* cited by examiner

| | | | | | | 27 | 28 | | | 31 |
|---|---|---|---|---|---|---|---|---|---|---|
| 0 | | 3 4 | | 7 8 | | | V | U | C | P |

FIG. 9

| M | Ch. "A" | W | Ch. "B" | S | Ch. "A" | W | Ch. "B" | M | Ch. "A" | W | Ch. "B" |
|---|---|---|---|---|---|---|---|---|---|---|---|
| | 191 | | | | 0 | | | | 1 | | |

FLOW CONTROL MECHANISMS ON SYNCHRONOUS SERIAL TDMA BUS

TECHNICAL FIELD

The present invention relates to a method of transferring data between two or more integrated circuits, and to integrated circuits that are adapted to operate in accordance with such a method.

BACKGROUND

In many situations, it is necessary or desirable to transfer data between two or more integrated circuits, or chips. For example, many electronic products are relatively complex, and include multiple integrated circuits, and it is necessary for these to be able to communicate with each other.

The Mobile Industry Processor Interface (MIPI) Alliance is an organization that is working to define specifications for interfaces to mobile application processors. It is proposed that an inter-chip or inter-integrated circuit bus should be provided for the transfer of digital audio and low speed data. The proposed bus is based on the principle of time division multiple access (TDMA). The proposed bus operates in a synchronous way and comprises a clock line and a data line.

Synchronous TDMA busses are known, but these typically do not provide a flexible scheme for flow-controlled data transmission. For instance AC'97 ("Audio Codec '97, Revision 2.3 Revision 1.0", Intel, April 2002) provides a very basic method for a pulled data model (Sample on Demand) but does not allow UART emulation for instance. The S/PDIF interface (Sony/Philips Digital Interconnect Format, also IEC 958 type II, which is part of the IEC-60958 standard) and the McBSP interface of Texas Instruments do not provide flow control mechanisms.

SUMMARY

According to a first aspect of the present invention, there is provided a method of transmitting data from a source to at least one sink over a synchronous TDMA bus, the method comprising:
defining a channel, by identifying the source and the at least one sink;
defining a transport profile, wherein said transport profile indicates a flow control requirement for said data;
transmitting said data from said source over said bus in at least one data time slot; and
if indicated by said transport profile, transmitting flow control information from said source over said bus in at least one flow control time slot associated with said data time slot.

This has the advantage that flow control data can be sent with the user data. According to a second aspect of the invention, there is provided an electronic device, adapted to transmit and/or receive data in accordance with the method of the first aspect.

DETAILED DESCRIPTION

Figure 1:
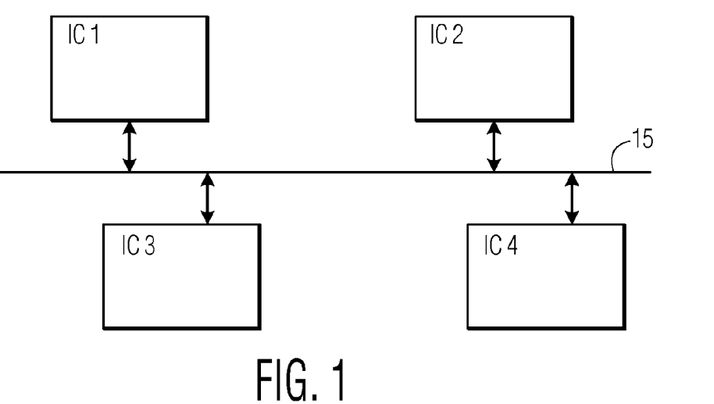
FIG. 1 is a block schematic diagram of an electronic device, operating in accordance with the present invention.

FIG. 1 illustrates a part of an electronic device 10, including four integrated circuits IC1, IC2, IC3, IC4, which are interconnected by means of a bus 15. It will be apparent to the person skilled in the art that the electronic device 10 may contain any desired number of integrated circuits, and will also contain other components, although it is not necessary to show these for a full understanding of the present invention.

In the illustrated embodiments, the bus 15 is a synchronous bus. That is, data is passed from one device to another on a data line, while a clock signal is sent on a second line, with the receiving devices being able to synchronize to the clock signal, so that they can correctly receive the data being transmitted on the data line.

Further, the bus 15 operates on a time division principle, with the time being divided into sub-frames, and each sub-frame being divided into time slots, in which binary signals can be transmitted. In this illustrated embodiment, four bits can be transmitted in each time slot, and there are 32 time slots in each sub-frame, and hence 128 bits in each sub-frame, although it will be appreciated that the invention can be applied to systems in which these parameters take any convenient values.

In the illustrated embodiment of the invention, each sub-frame can be divided into two parts, with the first part containing control channel information, and the second part containing the useful payload data.

Figure 2:
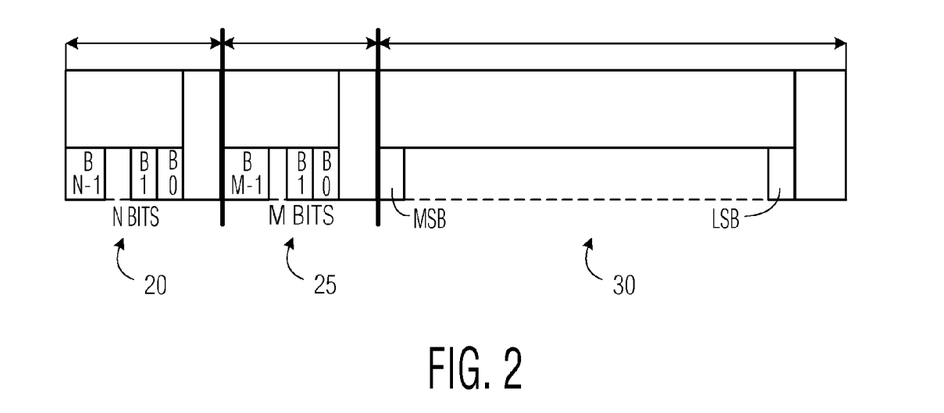
FIG. 2 illustrates a data format, in use of a method in accordance with the present invention.

FIG. 2 illustrates the data structure for each sub-frame, in one embodiment of the invention. Specifically, the segment can include up to three distinct bit fields, namely the TAG field 20, the AUX field 25 and the DATA field 30.

The TAG field 20, if present, contains a collection of bits that shall fit in one or two time slots. The bits of the TAG field 20 are then used to carry flow control and flow information, as described in more detail below.

The AUX field 25, if present, contains a collection of bits that shall fit in one or two time slots, conveying information related to the data content, as described in more detail below.

The DATA field 30 shall contain the payload carried by the data channel. The DATA slots shall not use logical OR signalling. Unused bits have the value logical 0.

When data is to be transported over the bus 15, a channel must be defined. A channel has exactly one data source at a time and may have one or more data sinks. By definition, the source produces data and the sink consumes data. Each channel also has an associated transport profile, which is an attribute of the channel. The transport profile defines how flow control is performed for that specific channel and, in particular, how the flow control information shall be mapped to the bits in the TAG field, or TAG bits.

Thus, the TAG bits are used to carry the flow control information, as defined by the transport profile used in that data channel. One or multiple devices may drive every single TAG bit separately using logical OR signalling. Each TAG bit has an associated Read/Write state in every device that indicates if the device shall read or write the TAG bit. The R/W default state is defined by the profile in use. Unused bits have the value logical 0.

When the TAG bit R/W state is set to "Read" or logical level 0, the device reads the TAG bit logical level.

When the TAG bit R/W status is set to "Write" or logical level 1, the device has a more complex behaviour. Because of the logical OR signaling method and the NRZI coding, writing a 0 means not changing the data line level by keeping the output to a high impedance state. Writing a 1 means actively driving the bus to change its level (0 to 1 or 1 to 0). A device "writing" a 0 should actually read the bit level to see if somebody else is writing a 1 (used in the arbitration mechanisms described below).

As shown in FIG. 2, any TAG bits 20 appear in the sub-frame before the AUX bits 25, which in turn appear before the DATA bits 30. Thus, the channel segment structure is [TAG][AUX][DATA].

When there are no TAG bits defined by the transport profile, there are no time slots assigned to the TAG field in the channel segment. The channel segment structure is then [AUX][DATA], or simply [DATA] if there are also no AUX bits defined.

The AUX bits are independent of the transport profile. When there are no AUX bits defined, there are no time slots assigned to the AUX field in the channel segment. The channel segment structure is then [TAG][DATA], or simply [DATA] if there are also no TAG bits defined. The AUX slots shall not use logical OR signalling. Unused bits have the value logical 0.

As mentioned above, it is necessary when defining a channel to specify the profile in use. The following table gives the profiles available to be used, and the IDs by which they can be identified when defining the channel.

| ID | Profile Name | Type | # of TAG bits |
|---|---|---|---|
| 0 | Isochronous | Multicast | 0 |
| 1 | "Near" isochronous | Multicast | 2 |
| 2 | Sample On Demand | Unicast | 2 |
| 3 | Asynchronous | Unicast | 4 |
| 4 | Extended Asynchronous | Unicast | 8 |
| 5 . . . 13 | Reserved | — | — |
| 14 | User defined 1 | ? | 4 |
| 15 | User defined 2 | ? | 8 |

Figure 3:
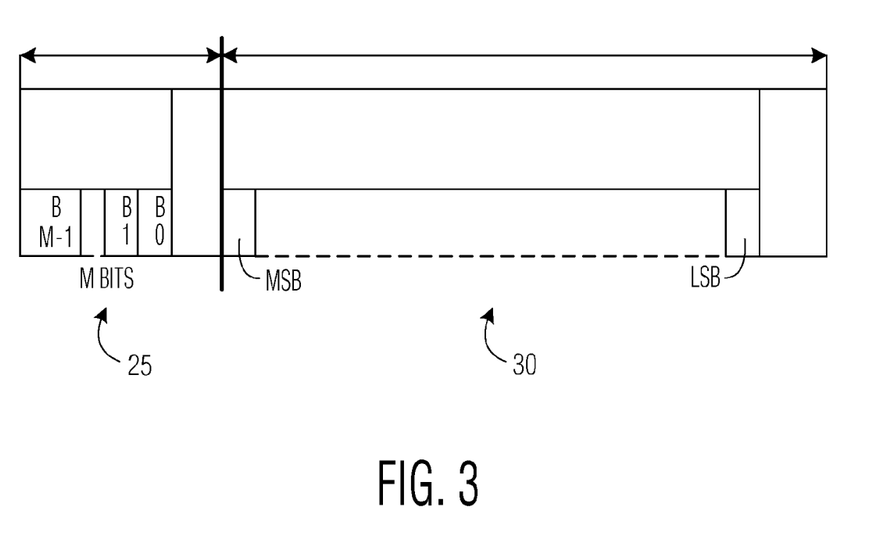
FIG. 3 illustrates a second data format, in use of a method in accordance with the present invention.

The Isochronous profile does not provide any flow information or any flow control. It is used to carry data whose rate matches exactly the channel rate. There are no TAG bits used and the size of the TAG field is therefore zero time slots. FIG. 3 illustrates the data structure for each sub-frame using this profile. Specifically, the segment can include the AUX field 25 and includes the DATA field 30.

A typical case where this may be used is in the transport of a 48 kHz sampling rate PCM audio (samples available 48000 times per second) over a 48 kHz channel rate (channel segment available 48000 times per second).

As an example, when 16 bits linear PCM audio shall be transported over the bus 15, the DATA field is 4 slots wide and there is no AUX bit. The segment size is then 4 slots (16 bits).

As mentioned in the table above, the isochronous profile allows multicasting. That is, it allows multiple sinks to be connected to a data channel.

The "Near" isochronous profile does include flow information. It is used to carry data whose rate does not match the channel rate. It relies on a push model. That is, the source shall drive the data flow and a bit in the TAG field 20 indicates the availability of data in the DATA field.

In this "Near" isochronous profile, as mentioned above, two TAG bits are required. Thus, as shown in the following table, one time slot (of four bits) is allocated, but two of the four bits are unused.

| Bit | Name | Source | Sink | Description |
|---|---|---|---|---|
| b3 | x | x | x | Don't care |
| b2 | P | W | R | PRESENT bit. P = 1 indicates that valid information are present in the DATA field |
| b1 | H | R | W | HAPPY bit. The sink must set H in the current segment every time the P bit is set |
| b0 | x | x | x | Don't care |

When the source decides to send data in the DATA field, it shall set the P bit. When the segment is not used by the source, it shall reset P (P=0) and not drive the bits of the AUX and DATA fields (high impedance mode).

The sink(s) shall read the P bit to detect if there is valid data in the DATA field. If the P bit is set, the sink shall read the data field. If the P bit is not set, the DATA field content shall be ignored.

Every time the P bit is set by the source, the sink(s) shall set the H bit. The source may read the H bit value to verify that at least one sink is still synchronized. The support of the Happy bit is mandatory for the sink devices and optional for the source devices.

A typical use case for which the 'near' isochronous profile is designed, is the transport of 44.1 kHz sampling rate PCM audio (samples available 44100 times per second) over a 48 kHz channel rate (channel segment available 48000 times per second). There will be 147 samples available every 160 channel segments. Thus, 13 channel segments out of every 160 will have to be ignored by the sink. The sink will know which segments to use, and which to ignore, by reading the P bits in the TAG time slots.

The "near" isochronous profile allows multiple sinks to be connected to the same data channel (multicast).

The following table gives an example of a sequence of events, making more explicit the mechanisms described before.

| Sequence | x | P | H | x | Comment |
|---|---|---|---|---|---|
| Segment i | x | 1 | 1 | x | Source places a valid (P = 1) sample in the segment. Sink reads it and sets the happy bit (H = 1) |
| Segment i + 1 | x | 1 | 1 | x | Source places a valid (P = 1) sample in the segment. Sink reads it and sets the happy bit (H = 1) |
| Segment i + 2 | x | 0 | 0 | x | Source has no sample available and resets P. Sink ignores data and resets the happy bit (H = 0) |

-continued

| Sequence | x | P | H | x | Comment |
|---|---|---|---|---|---|
| Segment i + 3 | x | 1 | 1 | x | Source places a valid (P = 1) sample in the segment. Sink reads it and sets the happy bit (H = 1) |
| Segment i + 4 | x | 1 | 1 | x | Source places a valid (P = 1) sample in the segment. Sink reads it and sets the happy bit (H = 1) |
| Segment i + 5 | x | 0 | 0 | x | Source has no sample available and resets P. Sink ignores data and resets the happy bit (H = 0) |
| Segment i + 6 | x | 1 | 1 | x | Source places a valid (P = 1) sample in the segment. Sink reads it and sets the happy bit (H = 1) |
| Segment i + 7 | x | 1 | 0 | x | Source has sample available and sets P. For some reason, sink does not set the Happy bit H. Source must assume that the sink is out of sync. |

FIG. 4 shows a series of state diagrams, illustrating a possible state machine used to implement the "near isochronous" profile. It relies on a FIFO (with a counter C and a size L) where the samples are stored.

Figure 4A:
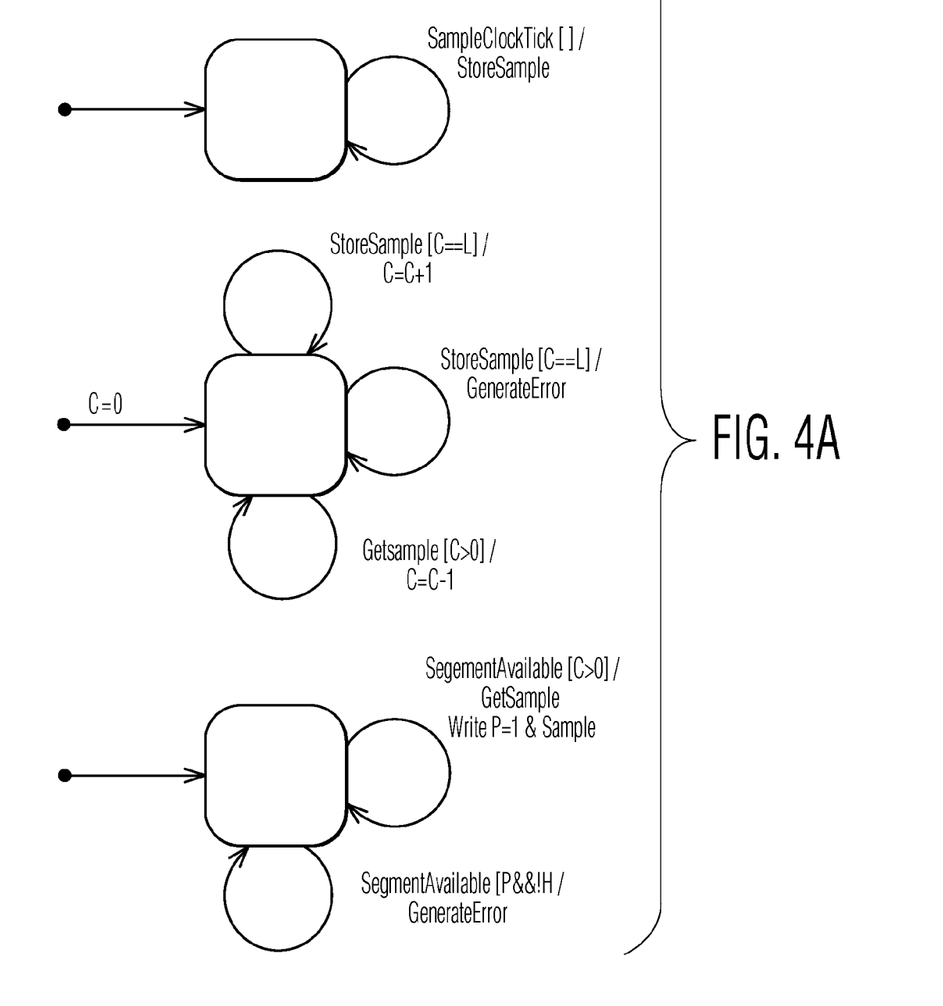
FIG. 4 illustrates the operation of two devices, in accordance with the present invention.

On the source side, as shown in FIG. 4(a), the FIFO is fed by the sample generator. It produces data at a given rate (SampleClockTick event). If the sample rate is higher than the channel rate, C will reach the buffer size (C==L) and will lead to a buffer overflow.

Figure 4B:
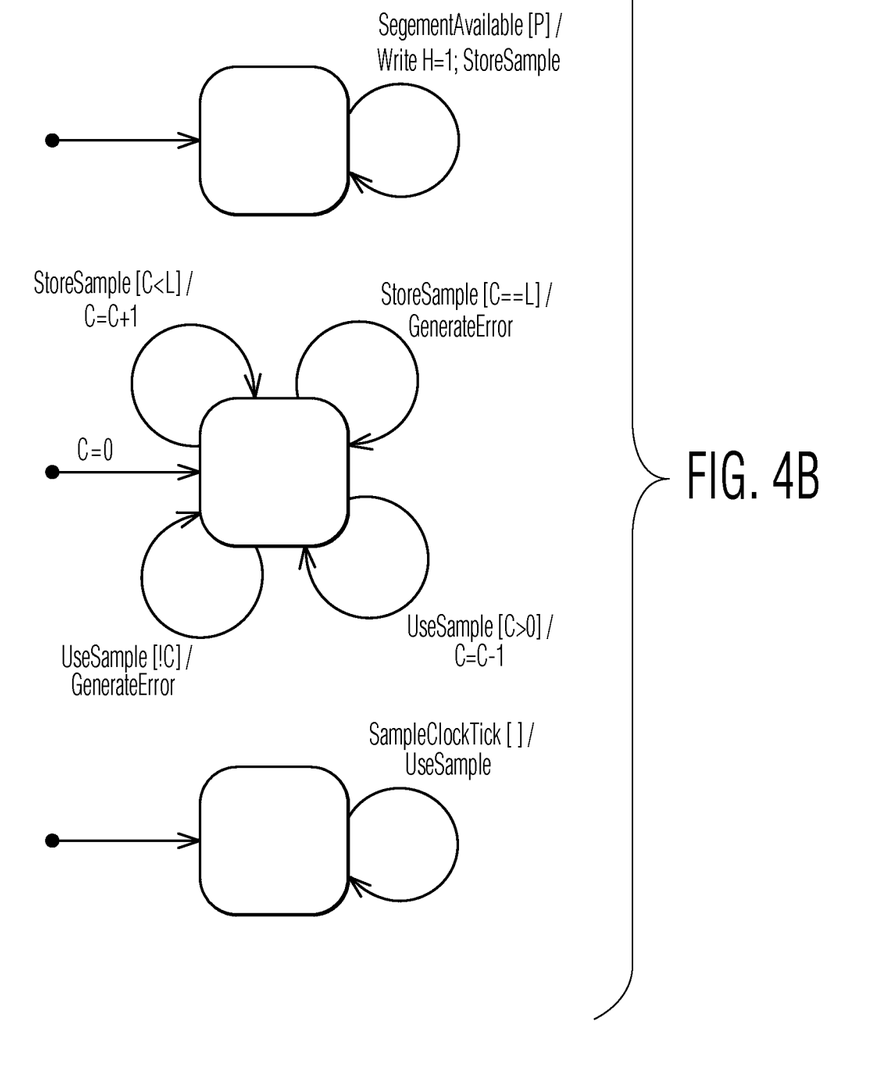

On the sink side, as shown in FIG. 4(b), the application (for example a digital analog converter) receives samples from the FIFO at a given rate (SampleClockTick event). Ideally, this rate shall exactly match the source sample rate. If this is not the case, the sink can face a buffer overflow (C==L) if the source rate is higher than the sink rate or a buffer under run (C==0) if the source rate is lower than the sink rate. The sink shall take the appropriate action to properly handle these error states.

The Sample on Demand profile provides a flow control mechanism, whereby the sink can request data from the source when needed. It thus relies on a pull model. It provides a point-to-point link with one source and only one sink. As mentioned above, two TAG bits are required. Thus, as shown in the following table, one time slot (of four bits) is allocated, but two of the four bits are unused.

| Bit | Name | Source | Sink | Description |
|---|---|---|---|---|
| b3 | x | x | x | Don't care |
| b2 | P | W | R | PRESENT bit. P = 1 indicates that valid information is present in the DATA field |
| b1 | SRQ | R | W | Sample ReQuest. SRQ = 1 requests a sample in the NEXT segment |
| b0 | x | x | x | Don't care |

The sink shall write the value of the SRQ (Sample Request) bit. The Source shall read the SRQ bit. When SRQ=1, the source shall provide a valid sample in the next segment and shall set the P bit to indicate that the sample is present. When SRQ=0, the source shall not write any data in the next Segment, but rather shall reset P and shall not drive the AUX+DATA fields. If, for any reason, the source is not capable of servicing the sample request on time, it shall set P to the logical value 0. This shall raise an error flag in the sink.

The use cases for this profile are similar to the ones of the "near" isochronous profile. More specifically, for example, when high-end audio quality is required and the system designer does not want to rely on the bus clock quality, it is an option to design a digital-analog converter (DAC) with its own high quality clock. The frequency mismatch between the bus clock and the DAC clock will be dealt with by use of the "Sample On Demand" profile.

The following table gives an example of a sequence of events, making more explicit the mechanisms described before.

| Sequence | x | P | SRQ | x | Comment |
|---|---|---|---|---|---|
| Segment i | x | 0 | 0 | x | Source waits for a sample request and does not place any data in the segment (P = 0). Sink does not need yet samples (SRQ = 0) and ignores the segment data |
| Segment i + 1 | x | 0 | 1 | x | Source waits for a sample request and does not place any data in the segment (P = 0). Sink ignores the segment data and requests a sample in the next segment (SRQ = 1) |
| Segment i + 2 | x | 1 | 1 | x | Source places a sample in the segment and sets P = 1. Sink reads the segment data and requests a sample in the next segment (SRQ = 1) |
| Segment i + 3 | x | 1 | 0 | x | Source places a sample in the segment and sets P = 1. Sink reads the segment data and does not request a sample in the next segment (SRQ = 0) |
| Segment i + 4 | x | 0 | 1 | x | Source waits for a sample request and does not place any data in the segment (P = 0). Sink ignores the segment data and requests a sample in the next segment (SRQ = 1) |

-continued

| Sequence | x | P | SRQ | x | Comment |
|---|---|---|---|---|---|
| Segment i + 5 | x | 0 | 1 | x | Source has no sample available and resets P. This is an error condition in the sink. Sink ignores the data and requests a sample in the next segment (SRQ = 1). |

FIG. 5 shows a series of state diagrams, illustrating a possible state machine used to implement the "sample on demand" profile. It relies on a FIFO (with a counter C, a size L and a threshold level T) where the samples are stored.

Figure 5A:
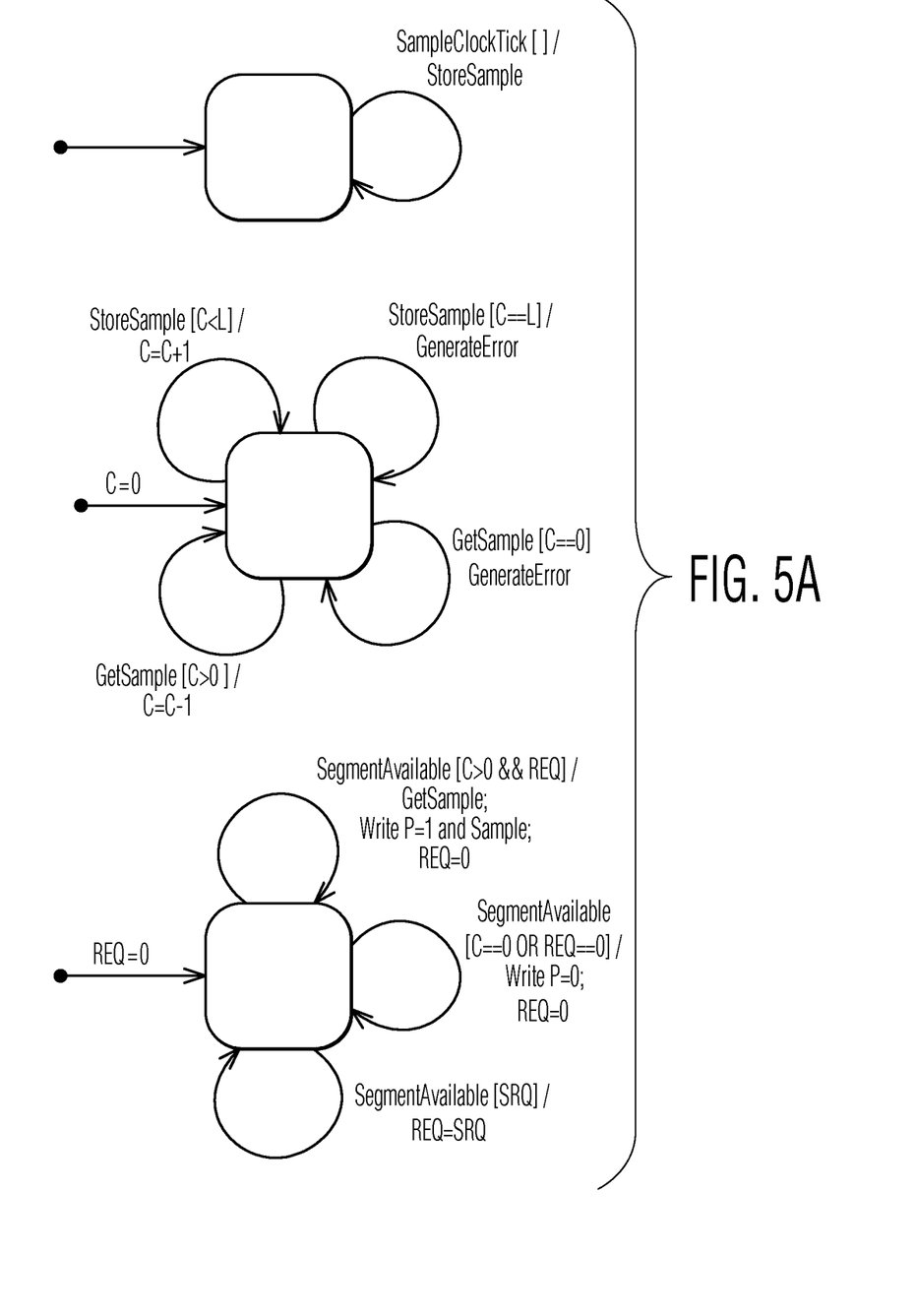
FIG. 5 illustrates an alternative operation of two devices, in accordance with the present invention.

On the source side, as shown in FIG. 5(a), the FIFO is fed by the sample generator. It produces data at a given rate (SampleClockTick event). If the sample rate is higher than the channel rate, C will reach the buffer size (C==L) and will lead to a buffer overflow. The release of the sample in the current segment is now conditioned by REQ, which retains the value of the SRQ bit of the previous segment.

Figure 5B:
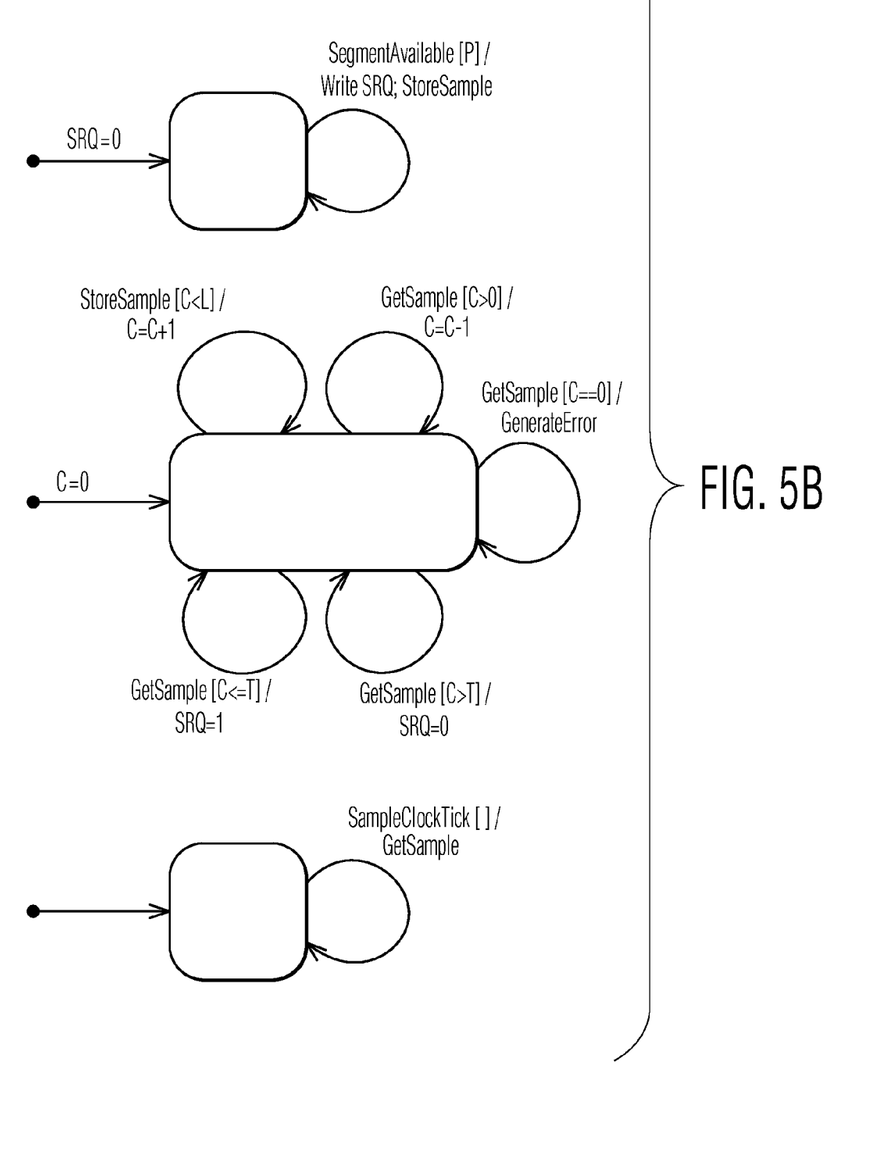

The sink, as shown in FIG. 5(b), monitors its FIFO level (C) and, if it goes below a given threshold (T), it requests a sample from the source by setting SRQ.

The asynchronous profile provides the necessary means to achieve an asynchronous data transmission, including flow control signals, over a serial synchronous link. In the asynchronous profile, as mentioned above, four TAG bits are required. Thus, as shown in the following table, one time slot of four bits is allocated.

| Bit | Name | Source | Sink | Description |
|---|---|---|---|---|
| b3 | T | W | W | Token. Used by the data source to indicate that it owns the AUX + DATA fields |
| b2 | P | W | R | PRESENT bit. P = 1 indicates that valid information is present in the DATA field |
| b1 | CTS | R | W | Clear To Send. CTS = 0 indicates that the source shall stop transmitting data |
| b0 | DR | W | R | Device Ready. Set when the device is ready to communicate. |

The ownership of the channel resource (that is, the AUX and DATA fields) is managed by a token. Write access to the channel resources is only granted to the device that owns the token. During the initial channel assignment phase, the device that is designated as a data source is the primary channel owner. The device that is designated as a data sink is the secondary channel owner. The channel is by default idle. That is, the token bit is not owned by either party, and has the logical value 0. When the T bit is reset, the CTS and DR bits shall be reset to 0.

A priority scheme is used to prevent both the primary owner and the secondary owner from attempting to obtain the token at the same time. The primary owner has the highest priority and will indicate this by setting both the T bit and the P bit when arbitrating for the token. By contrast, when the secondary owner attempts to get the token, it sets the T bit and reads the P bit. If the P bit has a logical value 1, the secondary owner knows that it has not obtained the token and shall wait for the T bit to become 0 again before making a new attempt. If the P bit has the logical level 0, the secondary owner wins the token and can start its transmission. The device that owns the token shall configure itself as a data source. The other device becomes de facto the data sink. When the T bit toggles from logical level 0 to logical level 1, the P bit does not indicate "Present" data anymore. It becomes a Priority bit and the sink shall ignore data in the current segment. Once the source is ready to communicate, it shall set the DR (Device Ready) bit to indicate to the sink that a transmission will begin. When the sink is ready to receive data, it shall set the CTS (Clear To Send) bit.

When the source has data available, it shall write it in the DATA field of the segment and shall set the P (Present) bit in the TAG field to the logical value 1 to indicate to the sink that data is available in the segment. If the source does not have any available data, it resets the P bit to logical value 0 and shall not drive the DATA field. If, for any reason, the sink can no longer accept data, it resets the CTS bit to logical value 0 and the source shall not transmit any further new data until the CTS bit is set again to logical value 1.

The following table gives an example of a sequence of events, making more explicit the mechanisms described before.

| Sequence | T | P | CTS | DR | Comment |
|---|---|---|---|---|---|
| Segment i | 0 | 0 | 0 | 0 | The channel is idle. The primary owner and the secondary owner do not want to transmit data |
| Segment I + 1 | 1 | 1 | 0 | 0 | Primary owner requests the token (T = 1 & P = 1). If secondary owner tried to get the token at the same time, it lost the arbitration. Primary owner becomes data source. Secondary owner becomes data sink |
| Segment I + 2 | 1 | 0 | 0 | 1 | Source sets its DR (Device Ready) bit to indicate to the sink that the transmission will begin |
| Segment I + 3 | 1 | 0 | 1 | 1 | Sink sets the CTS bit to indicate to the source that it is ready to accept data |
| Segment I + 4 | 1 | 1 | 1 | 1 | Source writes valid DATA in the segment (P = 1). Sink allows data to be present in the next segment (CTS = 1) |
| Segment I + 5 | 1 | 0 | 1 | 1 | Source does not have any available data to write in the segment (P = 0) Sink allows data to be present in the next segment (CTS = 1) |
| Segment I + 6 | 1 | 1 | 1 | 1 | Source writes valid DATA in the segment (P = 1). Sink allows data to be present in the next segment (CTS = 1) |

-continued

| Sequence | T | P | CTS | DR | Comment |
|---|---|---|---|---|---|
| Segment I + 7 | 1 | 1 | 0 | 1 | Source writes valid DATA in the segment (P = 1). Sink does not allow data to be present in the next segment (CTS = 0) |
| Segment I + 8 | 1 | 0 | 0 | 1 | Source does not write DATA in the segment (P = 0). Sink does not allow data to be present in the next segment (CTS = 0) |
| Segment I + 9 | 1 | 0 | 1 | 1 | Source does not write DATA in the segment (P = 0). Sink allows data to be present in the next segment (CTS = 1) |
| Segment I + 10 | 1 | 1 | 1 | 1 | Source writes valid DATA in the segment (P = 1). Sink allows data to be present in the next segment (CTS = 1) |
| Segment I + 11 | 0 | 0 | 0 | 0 | Source has finished its transmission and releases the token. It also reset the DR bit. Sink also resets its CTS bit. Channel is now idle |
| Segment I + 12 | 1 | 0 | 0 | 0 | Secondary owner arbitrates for the token. As P = 0, it gets the token and becomes the data source. Primary owner becomes the data sink |
| Segment I + 13 | 1 | 0 | 0 | 1 | Source sets its DR (Device Ready) bit to indicate to the sink that the transmission will begin |
| Segment I + 14 | 1 | 0 | 1 | 1 | Sink sets the CTS bit to indicate to the source that it is ready to accept data |
| Segment I + 15 | 1 | 1 | 1 | 1 | Source writes valid DATA in the segment (P = 1). Sink allows data to be present in the next segment (CTS = 1) |
| Segment I + 16 | 1 | 1 | 1 | 1 | Source writes valid DATA in the segment (P = 1). Sink allows data to be present in the next segment (CTS = 1) |
| Segment I + 17 | 1 | 1 | 1 | 1 | Source writes valid DATA in the segment (P = 1). Sink allows data to be present in the next segment (CTS = 1) |
| Segment I + 18 | 0 | 0 | 0 | 0 | Source has finished its transmission and releases the token. It also resets the DR bit. Sink also resets it CTS status |

The asynchronous profile shall only be used in a unicast point-to-point link, with one source and one sink.

Figure 6A:
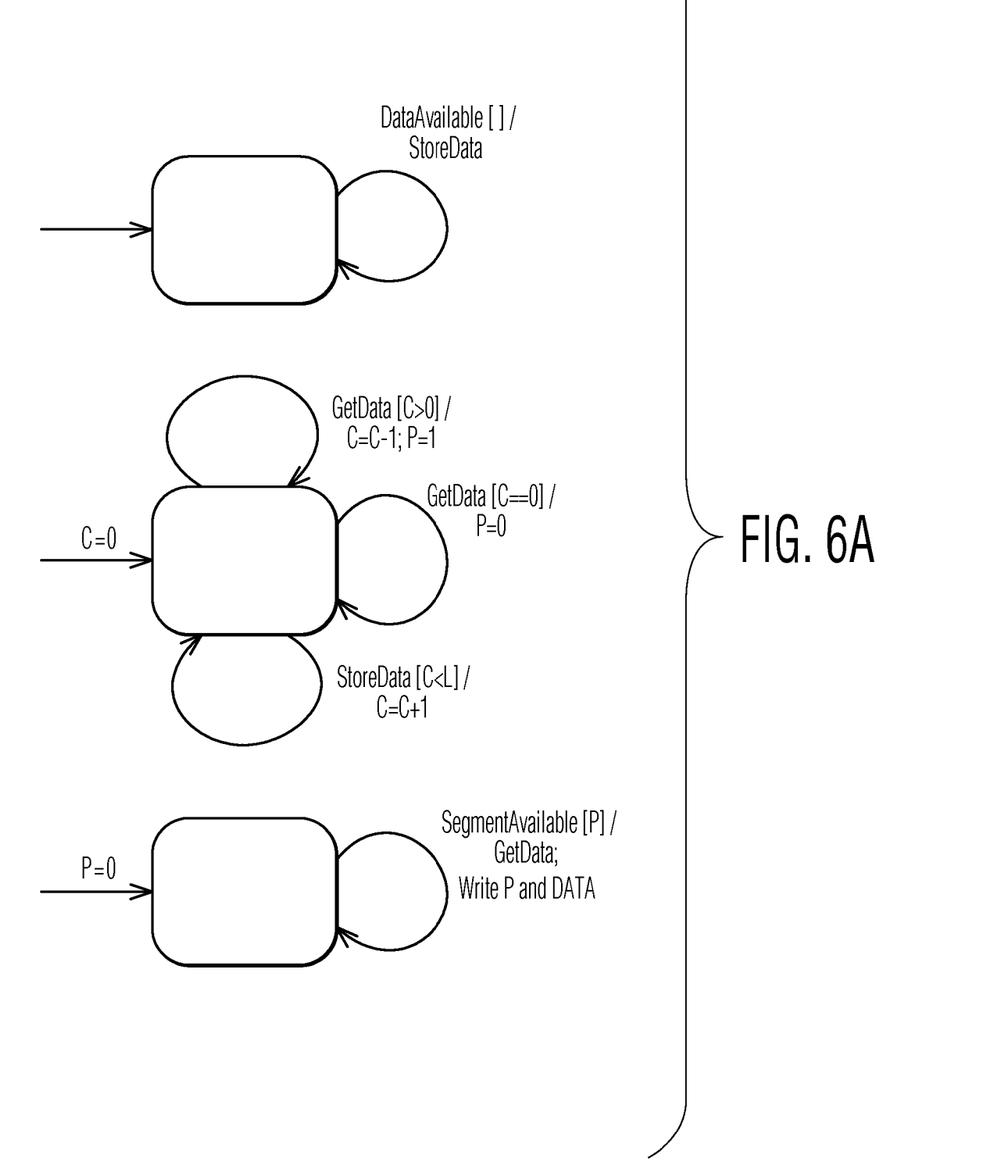
FIG. 6 illustrates a further alternative operation of two devices, in accordance with the present invention.
Figure 6B:
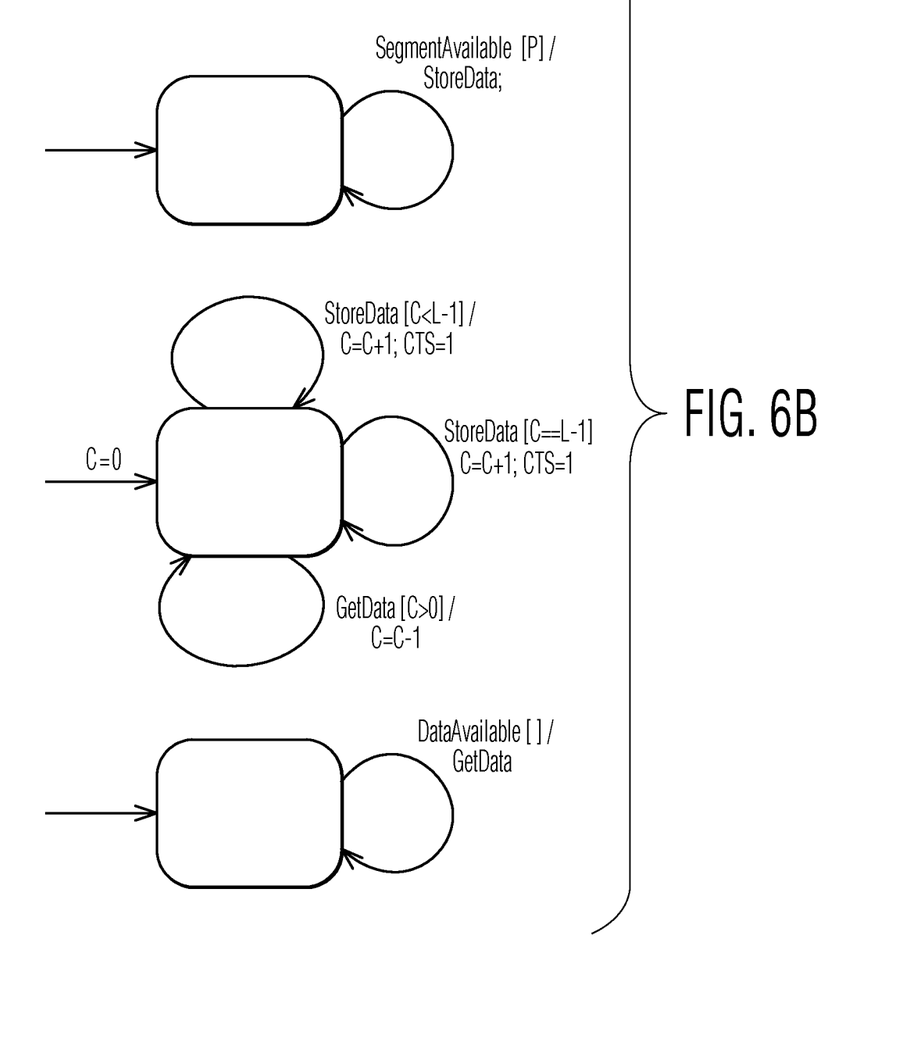

FIG. 6 shows a series of state diagrams, illustrating a possible state machine used to implement the "asynchronous" profile. It relies on a FIFO (with a counter C and a size L) where the data bytes are stored.

Figure 7:
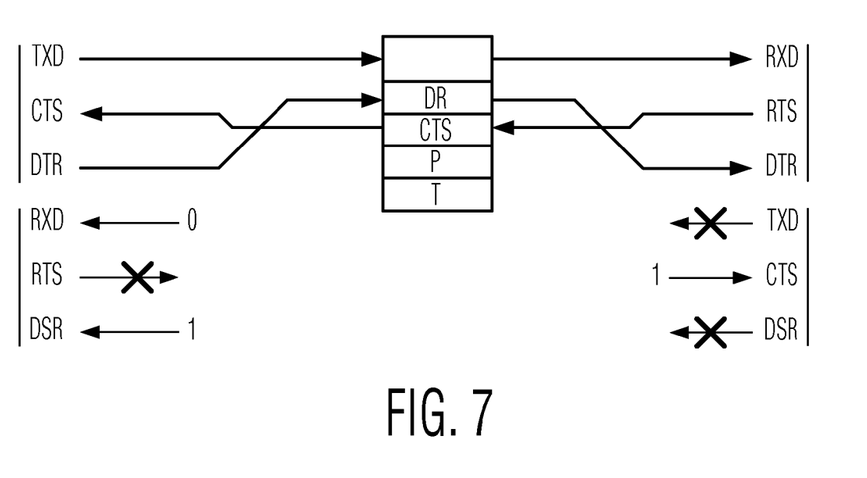
FIG. 7 illustrates a further alternative operation of two devices, in accordance with the present invention.

The asynchronous profile is half duplex by nature. That is, although data can be sent from the primary owner to the secondary owner, or from the secondary owner to the primary owner, it can only be sent in one direction at any time. When full duplex communication is required, with both devices being able to transmit data at the same time, two channels will be required, each using an asynchronous profile. When a device has two channels, each with an asynchronous profile, attached to two of its ports, with one as a source and one as a sink, it knows that a full duplex link is set up. In this configuration, the secondary channel owner shall never attempt to arbitrate for the Token. As shown in FIG. 7, the asynchronous profile can be used to emulate a conventional UART link, with the EIA232 signals mapped to the TAG bits defined in the asynchronous profile. This allows existing UART software drivers to be reused with a minimum amount of modification.

In FIG. 7, TxD and RxD are used to indicate the signals on the Transmit and Receive pins. The pins use a one bit serial line, whereas the profile provides one or more bytes, and so a serializer (in software or in hardware) is needed to provide a bit stream.

RTS (Request To Send) and CTS (Clear To Send) are the flow control signals. The RTS signal of the source is not carried by the asynchronous profile. The sink shall always assert its CTS input signal. As the source does not need to moderate the sink data flow, this is not an issue.

The RTS signal of the source actually triggers the token request but is not carried to the sink via a dedicated bit. The Token bit shall not be used to drive the CTS level of the sink.

The RTS signal of the sink is mapped in the CTS flow control bit of the profile. It will moderate the data flow from the source to the sink.

DTR signals that the DTE (using the naming from EIA232) is ready. The way that the DTR signal is used depends a lot on the application but, for legacy reasons, it is provided by the DR bit of the profile.

DSR signals to the DTE that the DCE (again, using the naming from EIA232), mainly modems, is actually ready to communicate over a phone line. The DSR signal is not provided by the profile and shall be always asserted.

It should be noted that the physical layer of a UART adds start and stop bits in the transmission. The asynchronous profile does not need to use these synchronization bits. The optional UART parity bit is also not implemented.

Figure 8:
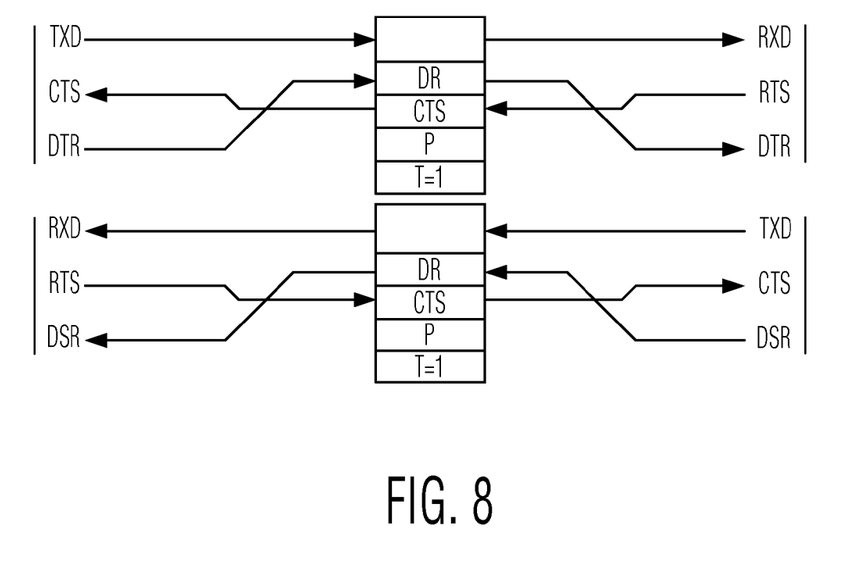
FIG. 8 illustrates a further alternative operation of two devices, in accordance with the present invention.

A full duplex emulation between two devices, A and B, relies on 2 channels using the asynchronous profile, as shown in FIG. 8.

In this case, the RTS level of device A is fed in the CTS bit of the data channel 2. It is read by device B and mapped on its CTS input signal. The RTS level of device B is fed in the CTS bit of the data channel 1. It is read by device A and mapped on its CTS input signal.

DTR signals that the DTE (again, using the naming from EIA232) is ready. The way DTR is used depends a lot on the application and is implemented for legacy reasons. The DTR level of device A (seen as the DTE) is fed in the DR bit of the data channel 1. It is read by device 2 and mapped on its DTR input signal.

DSR signals that the DCE (again, using the naming from EIA232) is ready. The way DSR is used depends a lot on the application and is implemented for legacy reasons. The DSR level of device B (seen as the DCE) is fed in the DR bit of the data channel 2. It is read by device A and mapped on its DSR input signal.

When the channel rate is low and the required data rate is high, it is possible to push multiple bytes in the segment DATA field. The asynchronous profile defined above has a DATA field that is 2 slots wide. As an alternative, an extended asynchronous profile is also defined, having a DATA field size that can range from 4 to 28 slots inclusive in steps of 2 slots. The principle of operation of this extended asynchronous profile is identical to that of the asynchronous profile.

It is however mandatory to indicate how many bytes are valid (and associated to the P bit) in the DATA field because the message length may not be a multiple of the DATA field length. Additional TAG bits shall be used to code the number of valid bytes.

A second TAG slot (4 bits) is allocated to the coding of the number of valid bytes G. The frame structure will not allow more than 14 bytes in the DATA field of the segment. Therefore, G will range from 0 to 14. The value 15 is illegal.

| Bit | Name | Source | Sink | Description |
| --- | --- | --- | --- | --- |
| b7 | T | W | W | Token. Used by the data source to indicate that it owns the AUX + DATA fields |
| b6 | P | W | W | PRESENT bit. P = 1 indicates that valid information is present in the segment DATA field. It is also a PRIORITY bit when the 2 devices arbitrate for the token |
| b5 | CTS | R | W | Clear To Send. CTS = 0 indicates that the source shall stop transmitting data |
| b4 | DR | W | R | Device Ready. Set when device is ready to communicate. |
| b3 | G3 | W | R | MSB of the G value |
| b2 | G2 | W | R | $2^{nd}$ bit of the G value |
| b1 | G1 | W | R | $3^{rd}$ bit of the G value |
| b0 | G0 | W | R | LSB of the G value |

The following table gives an example of a sequence of events, making more explicit the mechanisms described before. The example assumes that the DATA field is 16 slots wide (8 bytes) and that a message of 21 bytes shall be transported (2 packets of 8 bytes and one packet of 5 bytes).

As mentioned above, user defined profiles can also be provided for specific, unforeseen transmission types. When a user profile is used in a channel, it is assumed that both devices know the meanings of the TAG bits, and how to react to their changes. The user profile also defines the default R/W states of these TAG bits. In one embodiment, as shown above, it is possible to provide two user defined profiles, the first with four TAG bits and the second with eight TAG bits.

As mentioned above, the bits of the auxiliary (AUX) field carry side information linked to the content of the DATA field. They usually depend on the type of device producing the data. The AUX bits are driven by the data source.

For example, the AUX field can be used to tunnel data required for a S/PDIF interface. The IEC 60958 standard defines 4 bits that are transmitted concurrently with the audio data and the framing information. For stereo or multi-channel operation, it may be required to carry these bits along with the data on the bus. A S/PDIF frame is uniquely composed of two sub-frames, each one made up of 4 bit fields.

Figure 9:
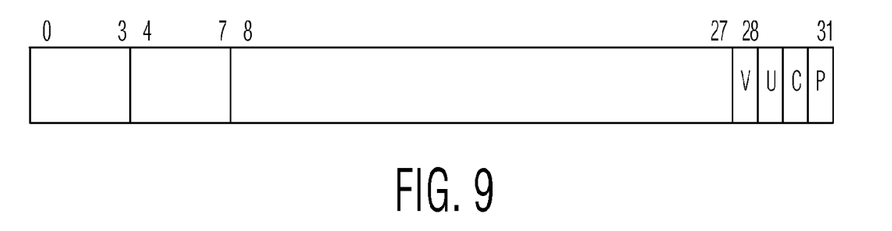
FIG. 9 illustrates a third data format, in use of a method in accordance with the present invention.
Figure 10:
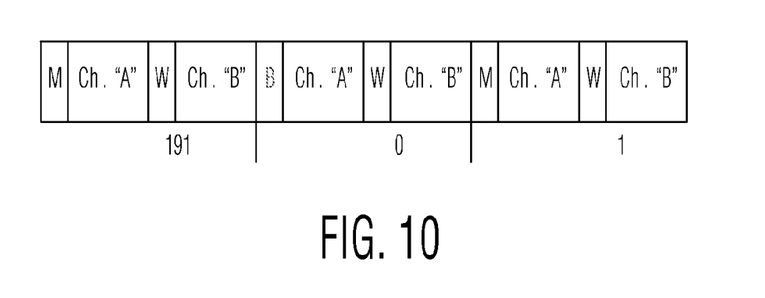
FIG. 10 illustrates a fourth data format, in use of a method in accordance with the present invention.

FIG. 9 illustrates the format of a sub-frame (in a linear PCM application, for example). Within a frame, the first sub-frame (the left or "A" channel in stereophonic operation) normally starts with the preamble "M". However, as shown in FIG. 10, the preamble changes to the preamble "B" once in every 192 frames to identify the start of the block structure used to organize the channel status information. The second sub-frame (the right or "B" channel in stereophonic operation) always starts with the preamble "W".

Bits 28 to 31 of the sub-frame shown in FIG. 9 are of interest for the definition of the AUX bit field in the frame structure shown in FIG. 2, while bits 4 to 27 of the sub-frame shown in FIG. 9 will be carried in the DATA field of that frame structure.

Thus, in FIG. 9, bit 28 "V" is a validity bit, which is set when the channel does not carry linear PCM audio; bit 29 "U" is the User Data bit, which is part of a block structure of 192 bits (see IEC60958); bit 30 "C" is the channel status,

| Sequence | T | P | CTS | DR | G | Comment |
| --- | --- | --- | --- | --- | --- | --- |
| Segment i | 0 | 0 | 0 | 0 | 0 | The channel is idle. The primary owner and the secondary owner do not want to transmit data |
| Segment i + 1 | 1 | 1 | 0 | 0 | 0 | Primary owner requests token (T = 1 & P = 1). Primary owner becomes data source, secondary owner becomes data sink |
| Segment i + 2 | 1 | 0 | 0 | 1 | 0 | Source sets its DR (Device Ready) bit to indicate to sink that the transmission will begin |
| Segment i + 3 | 1 | 0 | 1 | 1 | 0 | Sink sets the CTS bit to indicate to source that it is ready to accept data in the next segment |
| Segment i + 4 | 1 | 1 | 1 | 1 | 8 | Source writes valid DATA (8 bytes) in the segment (P = 1) data field and sink allows data to be present in the next segment (CTS = 1) |
| Segment i + 5 | 1 | 1 | 0 | 1 | 8 | Source writes valid DATA (8 bytes) in the segment (P = 1 ) data field and sink does not allow data to be present in the next segment (CTS = 0) |
| Segment i + 6 | 1 | 0 | 1 | 1 | 0 | Source does not write DATA in the segment (P = 0) and sink allows data to be present in the next segment (CTS = 1) |
| Segment i + 7 | 1 | 1 | 1 | 1 | 5 | Source writes valid DATA (5 bytes) in the segment (P = 1) and sink allows data to be present in the next segment (CTS = 1) |
| Segment i + 8 | 1 | 0 | 1 | 1 | 0 | Source does not write DATA in the segment (P = 0) and sink allows data to be present in the next segment (CTS = 1) |
| Segment i + 9 | 0 | 0 | 0 | 0 | 0 | Source has finished its transmission and releases the token. It also resets the DR bit. Sink also resets its CTS bit. Channel is now idle | which is part of a block structure of 192 bits (see IEC60958); and bit 31 "P" is the parity bit, computed in such a way that bits 4 to 31 inclusive will carry an even number of ones and an even number of zeros (that is, they will have even parity).

As the IEC60958 preamble is not transported with the data, the start of the block structure shall be announced in a different manner. The P bit can easily be reconstructed by a S/PDIF transmitter and does not carry crucial information. A "Z" bit indicating the start of a bloc structure can replace it. The Z bit shall be set every IEC60958 frame 0 and reset the rest of the time.

| Bit | Name | Description |
|---|---|---|
| b3 | Z | Start of block structure |
| b2 | C | Channel status bit, organized in blocks of 192 bits |
| b1 | U | User Data bit, organized in blocks of 192 bits |
| b0 | V | Validity. Set when the channel does not carry linear PCM audio |

Other, user defined, AUX formats can be provided for specific, undefined side band information. When a user-defined format is used in a channel, it is assumed that both devices know what the meaning of every AUX bit. Two formats are provided for, the first having four AUX bits and the second having eight AUX bits.

When defining a channel, is necessary to specify the format of the AUX bits in use. The following table gives the format ID to be used.

| AUX Format ID | AUX Format Name |
|---|---|
| 0 | No AUX bits |
| 1 | S/PDIF tunneling - 4 AUX bits |
| 2 . . . 13 | Reserved for future use |
| 14 | User defined 1 - 4 AUX bits |
| 15 | User defined 2 - 8 AUX bits |

There is thus provided a method of transmitting data that allows flow control information to be transmitted with the user data over a synchronous bus.

Although exemplary embodiments of the invention have been disclosed, it will be apparent to those skilled in the art that various changes and modifications can be made which will achieve some of the advantages of the invention without departing from the spirit and scope of the invention. Such modifications to the inventive concept are intended to be covered by the appended claims in which the reference signs shall not be construed as limiting the scope of the invention. Further, in the description and the appended claims the meaning of "comprising" is not to be understood as excluding other elements or steps. Further, "a" or "an" does not exclude a plurality, and a single processor or other unit may fulfill the functions of several means recited in the claims.

The invention claimed is:

1. A method of transmitting data from a source to at least one sink over a synchronous TDMA wired bus, the method comprising:
defining a channel, by identifying the source and the at least one sink;
selecting a transport profile from a plurality of predefined transport profiles, wherein the selected transport profile indicates a flow control requirement for the data;
transmitting, from the source, to the at least one sink, a datum over the synchronous TDMA wired bus in a subframe consisting of a single data payload consisting of one or more data time slots, and a tag field consisting of one or more flow control time slots; and
when indicated by the selected transport profile, transmitting, from the source, to the at least one sink, flow control information over the synchronous TDMA wired bus in at least one flow control time slot in the tag field of the subframe, the flow control information being uniquely associated with only the datum transmitted during the same subframe.

2. The method of claim 1, wherein one of the predefined transport profiles is a first profile that applies when the source is to push data to the at least one sink and the desired data rate is substantially equal to the channel rate.

3. The method of claim 2, wherein the first profile indicates no flow control requirement, and hence no flow control information is transmitted from the source.

4. The method of claim 1, wherein one of the predefined transport profiles is a second profile that applies when the source is to push the data to the at least one sink and a desired data rate is less than a channel rate.

5. The method of claim 4, wherein, when the second profile is identified, the source sets a first flag during each flow control time slot in the tag field of the subframe, the first flag being associated with only the datum transmitted in the single data payload of the subframe.

6. The method of claim 5, wherein each sink, on receipt of the first flag during the at least one flow control time slot in the tag field of the subframe, reads the datum transmitted in the single data payload of the subframe.

7. The method of claim 5, wherein the at least one sink, on receipt of the first flag during the at least one flow control time slot in the tag field of the subframe, sets a second flag during the at least one flow control time slot in the tag field of the subframe.

8. The method of claim 7, wherein the source applies the logical second flag set by the at least one sink to obtain a combined synchronization signal.

9. The method of claim 1, wherein one of the predefined transport profiles is a third profile that applies when the at least one sink is to pull the data from the source.

10. The method of claim 9, wherein, when the third profile is defined, the at least one sink sets a third flag during each flow control time slot in the tag field of the subframe, the third flag being associated with the datum transmitted in the single data payload of the subframe.

11. The method of claim 1, wherein one of the predefined transport profiles is a fourth profile that applies when the datum is transferred from a first device initially identified as the source to a second device initially identified as the at least one sink, and when the datum is transferred from the second device initially identified as the at least one sink to the first device initially identified as the source.

12. The method of claim 11, wherein each of the second device initially identified as the sink and the first device initially identified as the source sets a fourth flag during the at least one flow control time slot in order to indicate that the first device has the data for transmission.

13. The method of claim 12, wherein, during the at least one flow control time slot in the tag field of the subframe in which the first device initially identified as the source sets the fourth flag, the first device initially identified as the source also sets a fifth flag.

14. The method of claim 13, wherein, when the first device initially identified as the source has set the fourth flag, the first device initially identified as the source sets a sixth flag when the first device initially identified as the source is ready to send the datum.

15. The method of claim 14,
wherein, during the at least one flow control time slot in which the first device initially identified as the source sets the fourth flag, the second device initially identified as the at least one sink also reads the fifth flag, in order to determine whether the fifth flag has been set by the first device initially identified as the source;
wherein, when the fifth flag has been set by the first device initially identified as the source, the second device initially identified as the at least one sink does not attempt to transmit the datum; and
wherein, when the fifth flag has not been set by the first device initially identified as the source, the second device initially identified as the sink sets a sixth flag when the second device initially identified as the sink is ready to send the datum.

16. The method of claim 13, wherein, when one of the first device and the second device has set the sixth flag, the other of the first device and the second device sets a seventh flag when the other of the first device and the second device is ready to receive the datum.

17. The method of claim 16, wherein, when the other of the first device and the second device has set the seventh flag, the one of the first device and the second device begins transmitting the datum.

18. The method of claim 17, wherein, when the one of the first device and the second device no longer has the datum for transmission, the one of the first device and the second device resets the fourth flag.

19. The method of claim 11, wherein one of the predefined transport profiles is a fifth profile that applies when the datum is transferred from the first device initially identified as the source to the second device initially identified as the sink, or from the second device initially identified as the sink to the first device initially identified as the source, and corresponds to the fourth profile, and
wherein, when the fifth profile is defined, one of the first device and the second device transmitting the datum indicates during at least one auxiliary time slot in an auxiliary field of the subframe an amount of data to be transmitted in the single data payload of the subframe, wherein the single data payload includes the auxiliary field having the at least one auxiliary time slot.

20. The method of claim 11, wherein the fourth profile is configured to emulate a universal asynchronous receive and transmit (UART) link.

21. The method of claim 1, wherein the single data payload includes an auxiliary field having one or more auxiliary time slots.

22. A method of transmitting data from a source to at least one sink over a synchronous TDMA bus, the method comprising:
defining a channel, by identifying the source and the at least one sink;
selecting a transport profile from a plurality of predefined transport profiles, wherein the selected transport profile indicates a flow control requirement for the data;
transmitting a datum from the source over the synchronous TDMA bus in a subframe consisting of a single data payload consisting of one or more data time slots, and a tag field consisting of one or more flow control time slots; and
if indicated by the selected transport profile, transmitting flow control information from the source over the synchronous TDMA bus in at least one flow control time slot in the tag field of the subframe, the flow control information being uniquely associated with only the datum transmitted during the same subframe;
wherein one of the predefined transport profiles is a fourth profile that applies when the data may be transferred from a first device initially identified as the source to a second device initially identified as the sink, or from the second device initially identified as the sink to the first device initially identified as the source,
wherein the first device initially identified as the sink and the second device initially identified as the source each sets a fourth flag during the at least one flow control time slot in the tag field of the subframe in order to indicate that each has a datum for transmission, and
wherein, during the flow control time slot in which the first device initially identified as the source sets the fourth flag, the first device initially identified as the source also sets a fifth flag.

23. The method of claim 22, wherein, when the first device initially identified as the source has set the fourth flag, the first device initially identified as the source sets a sixth flag when the first device initially identified as the source is ready to send the datum.

24. The method of claim 22, wherein the single data payload includes an auxiliary field having one or more auxiliary time slots.

* * * * *